Feb. 15, 1938.                 C. NELSON                    2,108,594
                    METHOD OF CONSTRUCTING HOLDERS
                      Original Filed Aug. 29, 1935
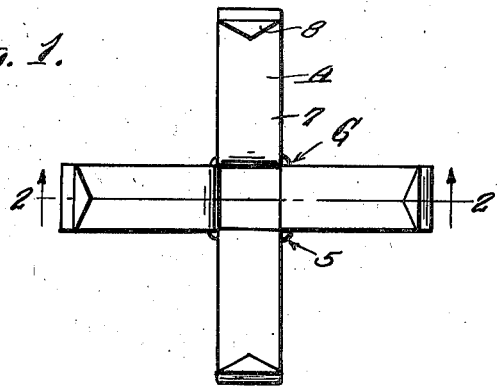
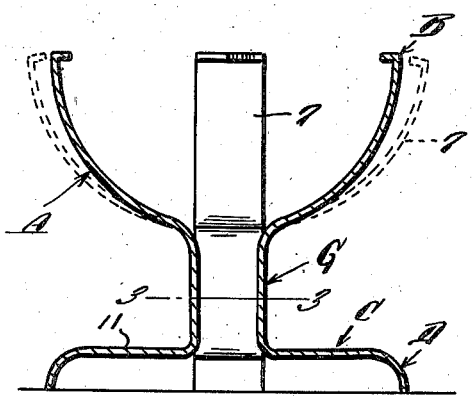
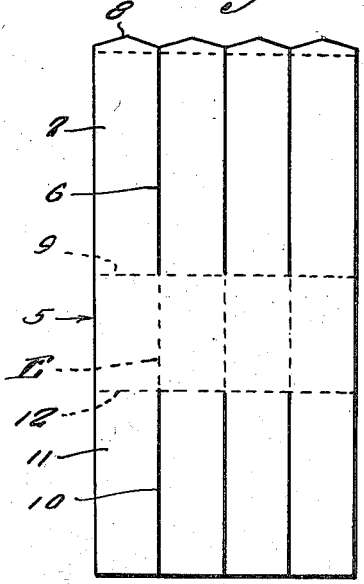
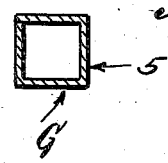
Inventor
Charles Nelson
By Clarence A. O'Brien
                    Attorney Patented Feb. 15, 1938

2,108,594

UNITED STATES PATENT OFFICE 2,108,594

METHOD OF CONSTRUCTING HOLDERS

Charles Nelson, Miami, Fla.

Application August 29, 1935, Serial No. 38,454
Renewed July 16, 1937

2 Claims. (Cl. 113—116)

This invention appertains to a method of constructing holders for fruit and more particularly to holders for fruit of the citrus variety.

The principal object of the present invention is to provide a method which can be easily executed to produce inexpensive holders for fruit and other items.

During the course of the following specification other important objects and advantages of the invention will become apparent to the reader.

In the drawing

Figure 1 represents a top plan view of the holder.

Figure 2 represents a vertical sectional view taken substantially on the line 2—2 of Figure 1.

Figure 3 represents a sectional view on line 3—3 of Figure 2.

Figure 4 represents a plan view of the sheet metal after it has been cut and before being bent into the form shown in Figures 1 and 2.

Referring to the drawing wherein like numerals designate like forms, it should be seen that numeral 5 represents a substantial rectangular shaped sheet of substantially thin metal which is split inwardly in a longitudinal direction at equal spaced intervals as at 6 to define fingers 7 and subsequently these fingers 7 are struck off to form a blunt point 8. The splits terminate on the imaginary line 9, while extending inwardly from the opposite end of the line are additional splits 10 defining fingers 11 of uniform width and these fingers terminate at the imaginary line 12.

In forming the holder, it can be seen that the fingers 7 are curved outwardly after the manner shown at A in Figure 2 and the blunt pointed ends 8 are bent inwardly as suggested at B in Figure 2. The finger members 11 are bent laterally as at C and then laterally in a downward direction as at D and the mid-portion of the plate 5 bent on the imaginary lines E to form a pedestal G as shown in Figure 2 of substantially square cross section. In this manner a holder is formed which can be readily employed for holding fruit such as grapefruit, oranges and other citrous varieties. The metal should be of a springy nature so that the arm 7 can spring out to the dotted line position shown in Figure 2 to receive the article of fruit.

While the foregoing specification sets forth the invention in specific terms, it is to be understood that numerous changes in the shape, size, and materials may be resorted to, such as adding or decreasing the number of fingers and legs, without departing from the spirit and scope of the invention as claimed hereinafter.

Having described the invention, what is claimed as new is:

1. A method of constructing article holders consisting in slitting a sheet of material inwardly from one end to provide a plurality of fingers, slitting the sheet inwardly from the other end to provide legs, bending the intermediate portion of the sheet so that one edge portion will be immediate to the other to provide a body portion, and diverging the said fingers outwardly to article supporting position, pointing and disposing inwardly the free ends of the fingers and bending the legs outwardly to supporting position.

2. A method of constructing article holders consisting in slitting a sheet of material inwardly from one end to provide a plurality of fingers, slitting the sheet inwardly from the other end to provide legs, bending the intermediate portion of the sheet so that one edge portion will be immediate to the other and to provide a body portion, bending the fingers outwardly and inwardly to form article supporting members, and bending the legs outwardly to supporting position.

CHARLES NELSON.